(12) United States Patent
Malik

(10) Patent No.: US 9,037,666 B2
(45) Date of Patent: *May 19, 2015

(54) SYSTEM AND METHOD FOR REGULATING ELECTRONIC MESSAGES

(71) Applicant: AT&T Intellectual Property I, L. P., Atlanta, GA (US)

(72) Inventor: Dale W. Malik, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 14 days.

This patent is subject to a terminal disclaimer.

(21) Appl. No.: 13/956,944

(22) Filed: Aug. 1, 2013

(65) Prior Publication Data

US 2014/0012933 A1      Jan. 9, 2014

Related U.S. Application Data

(60) Continuation of application No. 13/610,208, filed on Sep. 11, 2012, now Pat. No. 8,527,599, which is a continuation of application No. 12/022,648, filed on Jan. 30, 2008, now Pat. No. 8,291,023, which is a division of application No. 11/190,326, filed on Jul. 27, 2005, now Pat. No. 7,818,425, which is a continuation of application No. 09/888,719, filed on Jun. 25, 2001, now Pat. No. 6,957,259.

(51) Int. Cl.
*G06F 15/16* (2006.01)
*H04L 12/58* (2006.01)
*G06Q 10/10* (2012.01)

(52) U.S. Cl.
CPC .............. *H04L 51/12* (2013.01); *G06Q 10/107* (2013.01); *H04L 12/585* (2013.01)

(58) Field of Classification Search
USPC .................................................. 709/206, 207
See application file for complete search history.

(56) References Cited

U.S. PATENT DOCUMENTS

| | | |
|---|---|---|
| 5,961,590 A | 10/1999 | Mendez et al. |
| 5,978,837 A | 11/1999 | Foladare et al. |
| 5,999,932 A | 12/1999 | Paul |
| 6,023,723 A | 2/2000 | McCormick et al. |
| 6,047,310 A | 4/2000 | Kamakura et al. |
| 6,088,696 A | 7/2000 | Moon et al. |
| 6,216,165 B1 | 4/2001 | Woltz et al. |
| 6,266,692 B1 | 7/2001 | Greenstein |
| 6,292,211 B1 | 9/2001 | Pena |
| 6,421,709 B1 | 7/2002 | McCormick et al. |
| 6,453,327 B1 | 9/2002 | Nielsen |
| 6,499,021 B1 | 12/2002 | Abu-Hakima |
| 6,507,866 B1 | 1/2003 | Barchi |
| 6,574,658 B1 | 6/2003 | Gabber et al. |
| 6,643,687 B1 | 11/2003 | Dickie et al. |
| 6,654,787 B1 | 11/2003 | Aronson et al. |
| 6,691,156 B1 | 2/2004 | Drummond et al. |

(Continued)

*Primary Examiner* — Michael Y Won
(74) *Attorney, Agent, or Firm* — Wolff & Samson, PC

(57) ABSTRACT

A system for regulating e-mail comprises a database of information profiling legitimate e-mail usage. When an e-mail is received at the system, it is scrutinized relative to the information in the database. If the e-mail is found to be legitimate based upon this evaluation, it is delivered to the intended recipient. If, however, the e-mail appears on the basis of the evaluation to be the last in a series of illegitimate e-mails or otherwise has characteristics inconsistent with the profile of legitimate e-mail usage, the e-mail may not be delivered and the postmaster and administrator at the source of the e-mail is contacted.

20 Claims, 8 Drawing Sheets

(56) References Cited

U.S. PATENT DOCUMENTS

| | | |
|---|---|---|
| 6,708,205 B2 | 3/2004 | Sheldon et al. |
| 6,772,196 B1 | 8/2004 | Kirsch et al. |
| 6,779,021 B1 | 8/2004 | Bales et al. |
| 6,938,021 B2 | 8/2005 | Shear |
| 6,957,259 B1 * | 10/2005 | Malik ........................... 709/225 |
| 6,999,717 B2 | 2/2006 | Spratt et al. |
| 7,085,745 B2 | 8/2006 | Klug |
| 7,133,898 B1 | 11/2006 | Malik |
| 7,143,089 B2 | 11/2006 | Petras et al. |
| 7,149,778 B1 | 12/2006 | Patel et al. |
| 7,177,909 B2 | 2/2007 | Stark et al. |
| 7,277,919 B1 | 10/2007 | Donoho et al. |
| 7,310,688 B1 | 12/2007 | Chin |
| 7,454,457 B1 | 11/2008 | Lowery et al. |
| 7,644,274 B1 | 1/2010 | Jakobsson et al. |
| 2001/0023432 A1 | 9/2001 | Council et al. |
| 2001/0027474 A1 | 10/2001 | Nachman et al. |
| 2001/0049745 A1 | 12/2001 | Schoeffler |
| 2002/0021675 A1 | 2/2002 | Feldmann |
| 2002/0026484 A1 | 2/2002 | Smith |
| 2002/0049806 A1 | 4/2002 | Gatz et al. |
| 2002/0052855 A1 | 5/2002 | Landesmann |
| 2002/0091777 A1 | 7/2002 | Schwartz |
| 2002/0116641 A1 | 8/2002 | Mastrianni |
| 2002/0120702 A1 | 8/2002 | Schiavone et al. |
| 2002/0198950 A1 | 12/2002 | Leeds |
| 2003/0009526 A1 | 1/2003 | Bellegarda et al. |
| 2005/0108346 A1 | 5/2005 | Malik |
| 2005/0192899 A1 * | 9/2005 | Reardon ........................ 705/40 |
| 2008/0120379 A1 | 5/2008 | Malik |
| 2011/0035594 A1 * | 2/2011 | Fox .............................. 713/170 |

* cited by examiner

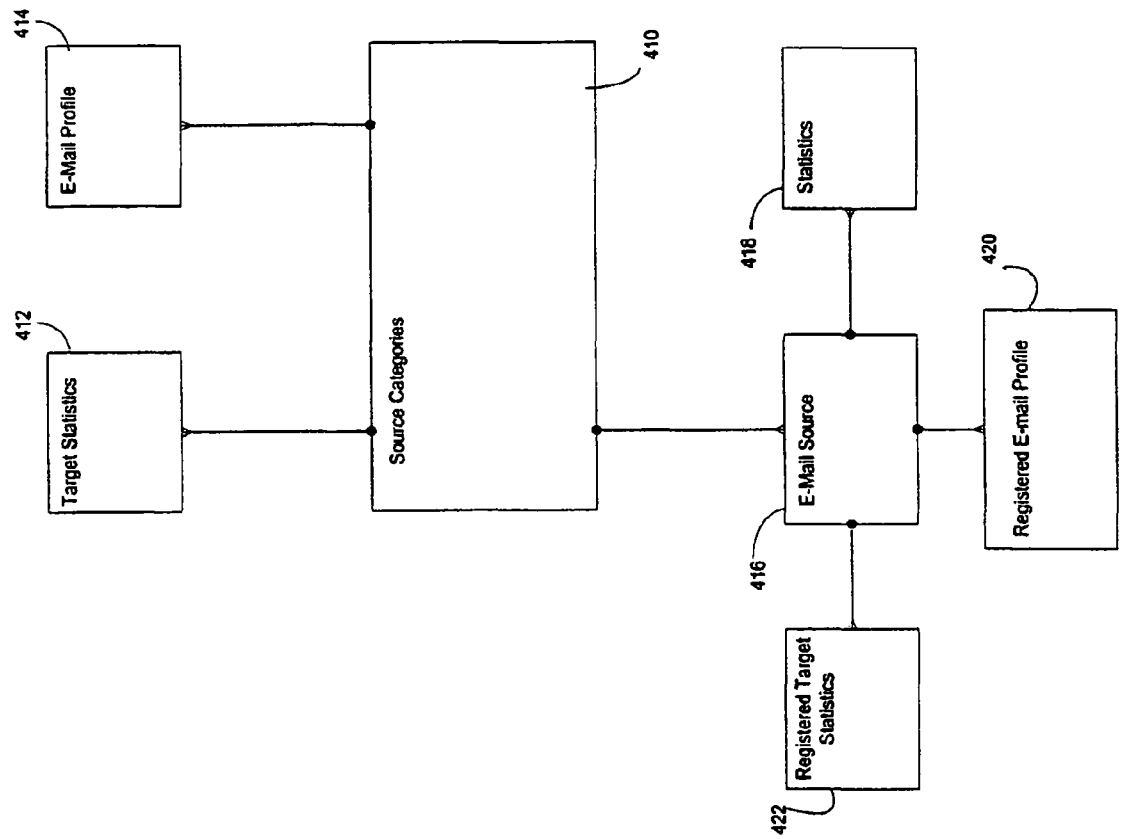

SYSTEM AND METHOD FOR REGULATING ELECTRONIC MESSAGES

This application is a continuation of U.S. patent application Ser. No. 13/610,208, filed on Sep. 11, 2012, which is a continuation of U.S. patent application Ser. No. 12/022,648, filed on Jan. 30, 2008, now U.S. Pat. No. 8,291,023, which is a divisional of U.S. patent application Ser. No. 11/190,326, filed on Jul. 27, 2005, now U.S. Pat. No. 7,818,425, which is a continuation of U.S. patent application Ser. No. 09/888,719, filed on Jun. 25, 2001, now U.S. Pat. No. 6,957,259, all of which are incorporated herein by reference.

FIELD OF THE INVENTION

The present invention relates generally to electronic messaging systems such as, for example, e-mail and instant messaging, and more particularly, to systems and methods for intelligently regulating such electronic messaging systems.

BACKGROUND OF THE INVENTION

Over the past fifteen years, the use of electronic messaging systems such as e-mail and instant messaging has experienced tremendous growth. People regularly send and receive e-mails and instant messages at all times of the day from work, from home, and even from mobile devices. Indeed, for many people, e-mail and instant messaging has become a primary means of communication.

While e-mail, instant messaging, and other such electronic messaging systems represent great technologies and have enhanced communication in our society, they do not come without costs. As an example, e-mail users spend significant amounts of time reviewing and replying to the numerous e-mails that they receive daily. This task has been made more cumbersome and time consuming by the large quantities of junk e-mail, or SPAM, that continuously flows into e-mail in-boxes. E-mail users must sort this SPAM in order to get to the e-mail that he or she desires to view. Instant messaging users are presented with similar problems in discerning from whom to receive messages.

The dramatic rise in e-mail and instant messaging usage has come at a cost to the organizations that maintain computer networks as well. In order to service the growing electronic messaging traffic, Internet service providers (ISP's) and corporate computer departments have needed to continuously upgrade their systems. Furthermore, additional personnel are required to run these systems and must be routinely trained on the new systems. Frequently, despite the best efforts of ISP's and corporate computer departments, the growth in demand for electronic messaging services outpaces the added capacity provided by system upgrades.

Applicant has recognized that requiring e-mail users to sift through ever increasing amounts of e-mail, much of which is junk e-mail, and relying upon ISP's and corporate computer departments to continuously upgrade their equipment to service the electronic messaging, is a less than optimal situation. Applicant has recognized that there exists a need to intelligently regulate the flow of e-mail and instant messages, particularly that which is commercial in nature. Indeed, systems and methods are needed to monitor the types and amounts of electronic messages that are being received and to regulate those electronic messages depending upon the source and characteristics of the messages. It would be a significant improvement in the art to provide systems and methods for recognizing junk messages and limiting the amount that is received in a given period. Such an improvement would reduce the amount of SPAM received by users and would preserve scarce system resources for legitimate messages.

SUMMARY OF THE INVENTION

Briefly, the present invention meets these and other needs in the art.

Generally, the invention relates to systems and methods for intelligently regulating electronic messages. A system in accordance with the invention comprises an electronic message server with access to a database of information profiling legitimate electronic message usage. When an electronic message is received at the electronic message server, it is scrutinized relative to the information in the database. If the electronic message is found to be legitimate based upon this evaluation, it is delivered to the intended recipient. If, however, the electronic message appears on the basis of the evaluation to be the last in a series of illegitimate usage or otherwise has characteristics inconsistent with the profile of legitimate electronic message usage, the electronic message may not be delivered and the postmaster or administrator at the site from which the electronic message originated is contacted.

According to an aspect of the invention, the administrator or postmaster may register sources from which he or she anticipates receiving electronic messages. Electronic messages received from registered sources may be evaluated under different criteria than those received from unregistered sources. During the registration process, the postmaster may define a profile for the registered source defining the amounts and types of e-mails that are acceptable from the particular source. The list of registered sites is stored in a database along with the profile data for those registered sources.

A database in accordance with an aspect of the invention stores data that is used in evaluating electronic messages. The database comprises data defining acceptable electronic message usages from both registered and unregistered sources.

With respect to unregistered sources, the database comprises a list of categories of sources from which electronic messages might be received. These categories are referred to herein as "electronic message source categories." Typical electronic message source is categories might include, for example, the following: large ISP—designating ISP's servicing a large number of users; medium ISP—designating ISP's servicing a medium number of users; small ISP—designating ISP's servicing a small number of users; .gov—designating sources in the .gov domain; .edu—designating sources in the .edu domain; and .com—designating sources in the com domain. Of course, other electronic message source categories may be used depending upon the type of electronic messages that it is desired to regulate.

The database further comprises a set of target statistics for each of the electronic message source categories. For example, the target statistics might include a maximum electronic message volume that may be received in a prescribed period of time from a source in a particular source category. The database may prescribe, for example, that a maximum of 200,000 e-mails may be received and processed from a source that is classified in the ".edu" source category. As explained in further detail below, the category statistics operate as benchmarks for the electronic message sources that fall within the particular category.

A set of target electronic message profiles is also maintained in the database for each electronic message source category. The target electronic message profiles identify target characteristics for electronic messages that are received from a source in a particular source category. For example, the target electronic message profile for a particular source category might identify the maximum size for an e-mail, the types of attachments that might be included with the e-mail, and the maximum number of "hops" that the e-mail may have taken prior to arriving at the electronic message server. These characteristics are used as benchmarks to identify irregular electronic message activities.

The database further comprises a set of statistics for each electronic message source. The statistics are continuously updated to reflect each electronic message that is received from a particular source. For example, each time an e-mail or an instant message is received in the system from a particular source such as, for example, www.bellsouth.com, the statistic holding the counter of e-mails or instant messages received from that particular site is incremented.

For each source that has been registered by the postmaster, a profile is established in the database identifying target statistics for each registered source and the types of electronic messages that are expected to be received from the source. The profile data for a registered source may include much of the same data that is collected for unregistered sites including the maximum size for an e-mail, the types of attachments that might be included with the e-mail, and the maximum number of "hops" that the e-mail may have taken prior to arriving at the electronic message server. The profile for a registered source might also identify whether the source has agreed to pay for certain services such as payment for the delivery of e-mail or the creation of e-mail usage reports.

An electronic message server in accordance with the invention implements methods using the above-described database to intelligently regulate the flow of electronic messages. According to a method in accordance with the invention, upon receipt of an electronic message, the source of the electronic message is identified and the statistics that are maintained for the electronic message source are updated to reflect the arrival of the new electronic message. For example, if an e-mail or instant message is received from smith@bellsouth.com, the statistic in the database identifying the number of e-mails or instant messages from bellsouth.com and the range of IP addresses that are associated with bellsouth.com are incremented.

Those skilled in the art will recognize that an electronic message that has been forwarded numerous times may have multiple domains or "sources" listed in its header. A single electronic message may be said to have "originated" from more than one source. Therefore, according to an aspect of the invention, for purposes of regulating messages an electronic message may be designated as originating from more than one source. For example, a single electronic message may be said to have originated from the first or the last "hop" identified in the header information. An electronic message that is designated as having originated from more than one domain is evaluated as described below twice, once for each of the two sources.

After the source of an electronic message has been identified, it is determined whether the source is registered or not. If so, the electronic message is evaluated relative to the profile data stored for the particular registered source.

If the electronic message was received from an un-registered source, the source category corresponding to the un-registered source is identified. With respect to the example e-mail or instant message from smith@bellsouth.com, the ".com" source category is identified. The statistics for the source of the e-mail or instant message, which have been updated to reflect receipt of the e-mail or instant message, are compared to the target statistics for the particular category. If the statistics for the source fail to comply with the benchmark target statistics, the sender and/or postmaster of the source from which the e-mail or instant message is received is automatically notified of such if it is a registered source. For example, if the volume of e-mail received from the source bellsouth.com exceeds the target volume, which may be indicative that SPAM is originating from bellsouth.com, an e-mail is sent to the sender and/or postmaster at www.bellsouth.com. The e-mail might indicate, for example that the amount of e-mail originating from the site has reached an unacceptable level along with a request to either reduce the volume of is e-mail being forwarded or to contact the postmaster at the destination site. The postmaster of the e-mail system at bellsouth.com can investigate the cause for the excessive e-mail activity and if it turns out to be legitimate and was not a one-time occurrence, may interact with the postmaster at the recipient to negotiate accepting a larger volume of e-mail.

An electronic message server in accordance with the invention also operates to regulate the flow of electronic messages based upon a comparison of the electronic messages to a profile of acceptable electronic message characteristics. Accordingly, when an electronic message is received, and after it's source and source category have been identified as explained above, the profile for an acceptable electronic message from the particular source criteria are retrieved. If the electronic message fails to fall within the profile for the source category, it may be indicative of a virus or possibly SPAM, in which case, the electronic message is not delivered to the intended recipient but instead is returned to the sender and/or the postmaster of the site from which the electronic message originated.

If the electronic message satisfies the profile, it is further evaluated against a list of known viruses. If a virus is detected, the message is not delivered and the postmaster is notified. If, however, no virus is detected, the electronic message is delivered to the intended recipient.

Additional aspects of the invention are described in detail below.

BRIEF DESCRIPTION OF THE DRAWINGS

Other features of the invention will be further apparent from the following detailed description of presently preferred exemplary embodiments of the invention taken in conjunction with the accompanying drawings, of which:

FIG. 4 is a diagram representing data entities stored in a database system in accordance with an embodiment of the present invention;

DETAILED DESCRIPTION OF THE INVENTION

A system and method with the above-mentioned beneficial features in accordance with a presently preferred exemplary embodiment of the invention will be described below with reference to FIGS. 1-6. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

Generally, the invention relates to systems and methods of intelligently regulating electronic messages. A system in accordance with the invention comprises an electronic message server with access to a database of information profiling legitimate electronic message usage. When an electronic message is received at the server, it is scrutinized relative to the information in the database. If the electronic message is found to be legitimate based upon this evaluation, it is delivered to the intended recipient. If, however, the electronic message appears on the basis of the evaluation to be the last in a series of unexpected usage or otherwise has characteristics inconsistent with the profile of legitimate electronic message usage, the electronic message may not be delivered and the sender and/or the postmaster at the site from which the electronic message originated is contacted.

An exemplary embodiment of a system and method for regulating electronic messages is described below. Specifically, a system and method for regulating e-mail is described below. The systems and methods are presented for exemplary purposes only and are not meant to limit the scope of the invention. Accordingly, those skilled in the art recognize that the invention applies to other types of electronic messages other than e-mail such as, for example, instant messages. Indeed, the present invention applies to any type of electronic message that can be said to originate from a particular Internet domain.

Figure 1:
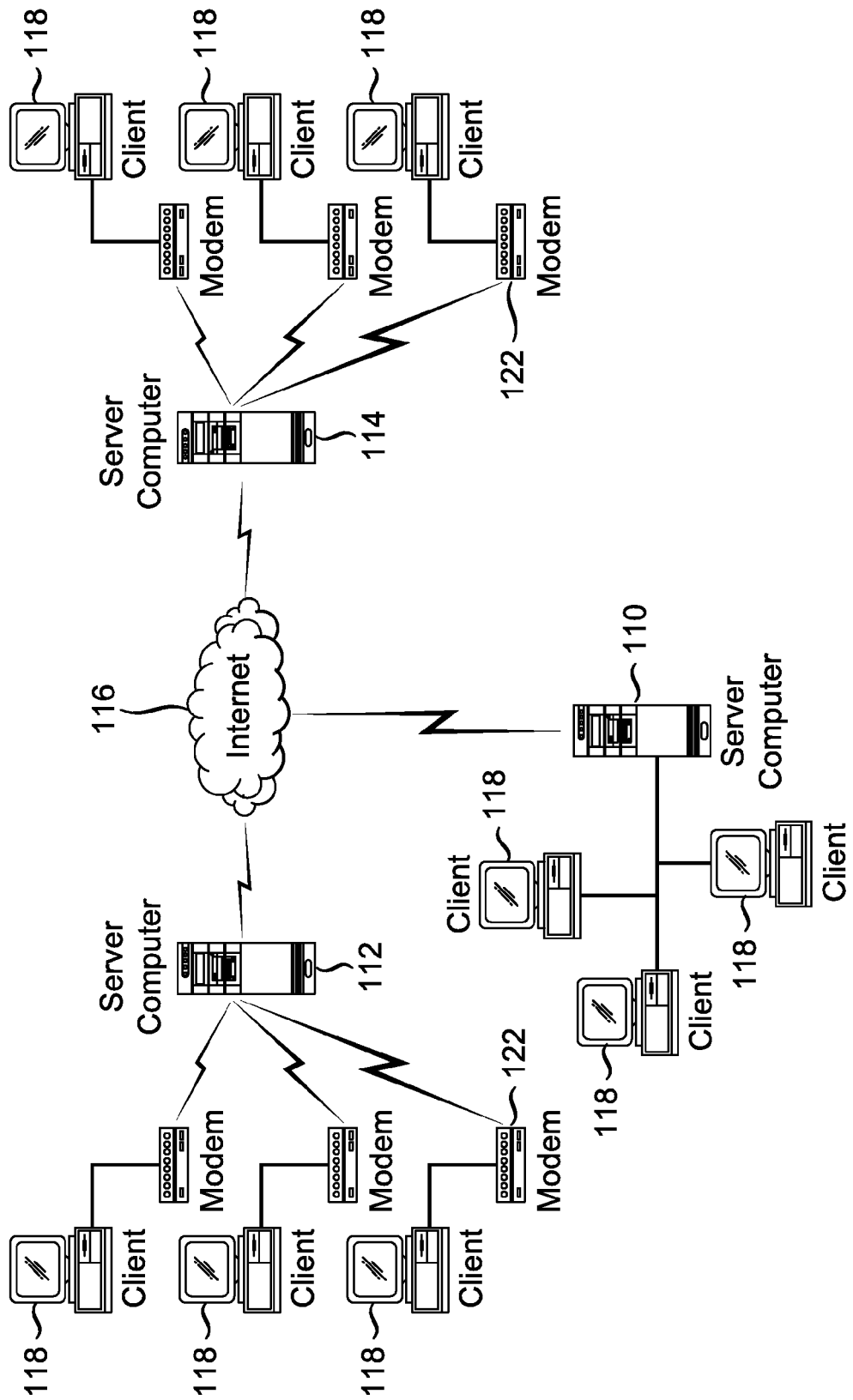
FIG. 1 is a high level diagram of a network for transmitting electronic messages.

FIG. 1 is a high level diagram of an exemplary computer network for communicating e-mail. As shown, three e-mail servers 110, 112, and 114 are operable to communicate with one another over network 116, which may be for example, the Internet. E-mail servers 110, 112, and 114 communicate e-mails. E-mail servers 110, 112, and 114 may be operated by an ISP, a corporate computer department, or any other organization with a mail server connected to Internet 116. Each of mail servers 110, 112, and 114 are accessible by client stations 118 from which users send and receive e-mails and browse web pages. Client stations 118 may connect to mail servers via a local area network (LAN) 120, as shown in relation to server 110, or using a remote connection device 122 such as, for example, a modem, as is shown in connection with servers 112 and 114.

In the system of FIG. 1, e-mails are composed at client stations 118 and forwarded to one of e-mail servers 110, 112, and 114. E-mail servers 110, 112, and 114 communicate the e-mails over Internet 116 using SMTP and POP protocols. The e-mails are ultimately delivered at one of e-mail servers 110, 112, and 114. Client stations 118 use client e-mail software to access the e-mail from the servers.

E-mail servers 110, 112, and 114 comprise e-mail server software. Specifically, servers 110, 112, and 114 comprise simple mail transfer protocol (SMTP) and post office protocol (POP) software for receiving and routing e-mail. Those skilled in the art will recognize that while servers 110, 112, and 114 are depicted using a single machine in FIG. 1, the servers may comprise a plurality of computing machines, i.e. more than a single server machine may be employed to provide the functionality described herein as being provided by the server.

Client stations 118 comprise e-mail client software for communicating with e-mail servers 110, 112, and 114. Those skilled in the art will recognize that while client stations 118 are depicted as desk top computers, virtually any type of computing machine such as, for example, a PDA, a cell phone, or a lap top computer are suitable as an e-mail client.

Figure 2:
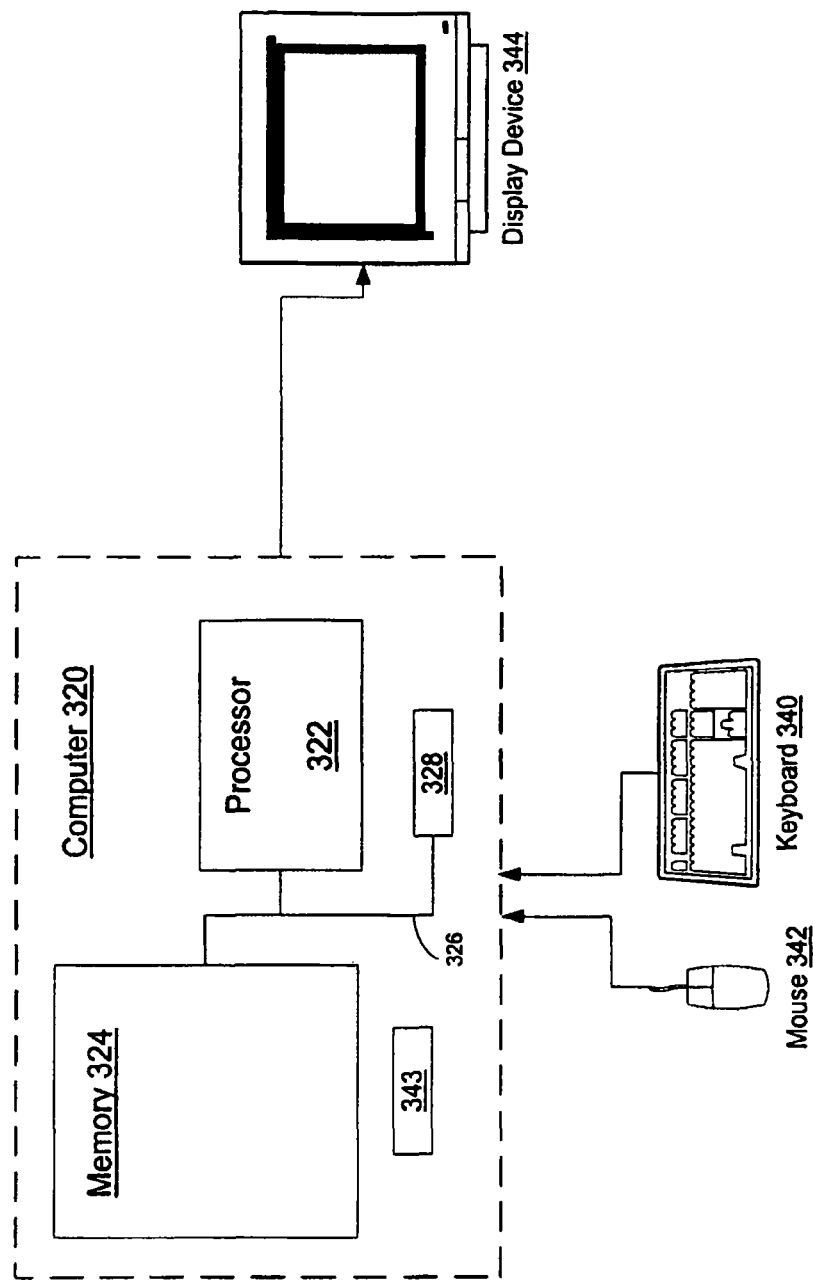
FIG. 2 is a block diagram of a computing system suitable for use in an embodiment of the present invention.

E-mail servers 110, 112, and 114 as well as client stations 118 are generic computing systems. FIG. 2 is a block diagram of a generic computing system suitable for use in a system in accordance with the present invention. As shown, computing device 320 includes processing unit 322, system memory 324, and system bus 326 that couples various system components including system memory 324 to the processing unit 322. The system memory 324 might include read-only memory (ROM) and random access memory (RAM). The system might further include hard-drive 328, which provides storage for computer readable instructions, data structures, program modules and other data. A user may enter commands and information into the computer 320 through input devices such as a keyboard 340 and pointing device 342. A monitor 344 or other type of display device is also connected to the system for output. Communications device 343, which in one embodiment may be a modem, provides for communications over network 102. Processor 322 can be programmed with instructions to interact with other computing systems so as to perform the algorithms described below with reference to FIGS. 5A-C and 6. The instructions may be received from network 102 or stored in memory 324 and/or hard drive 328. Processor 322 may be loaded with any one of several computer operating systems such as Windows NT, Windows 2000, or Linux.

Figure 3:
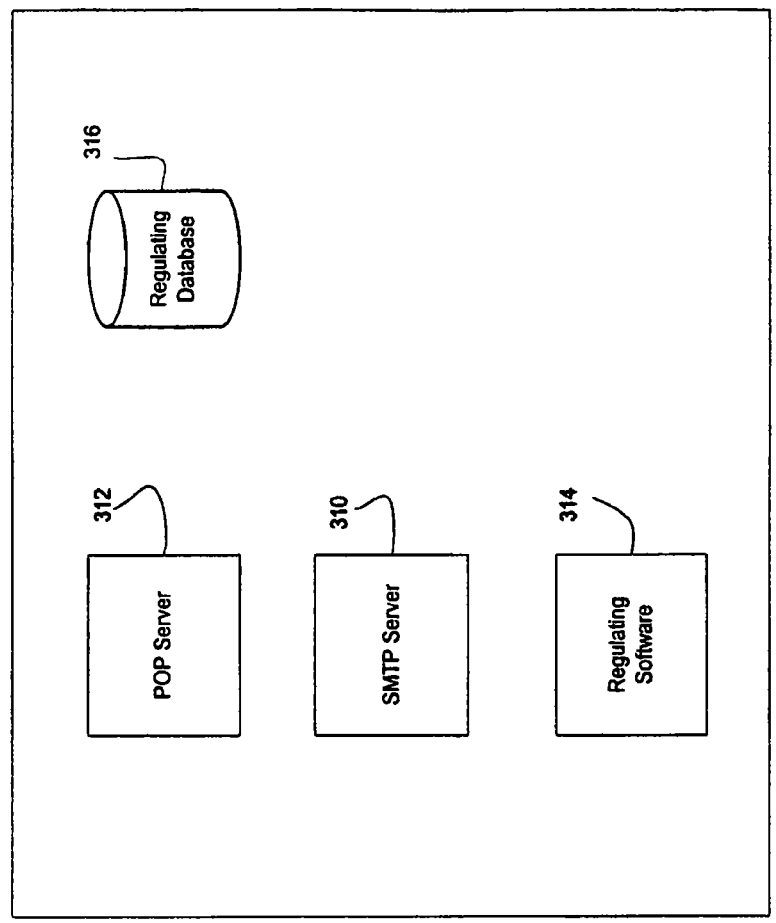
FIG. 3 is a diagram illustrating the functional components of a server computer or cluster of server computers for use in an embodiment of the present invention.

FIG. 3 is a diagram of the software components of e-mail servers 110, 112, and 114. As shown, servers 110, 112, and 114 comprise SMTP server software 310, POP server software 312, regulating software 314, and database 316. SMTP server software 310 operates according to known methods to route outgoing e-mails. POP server software 312 similarly operates according to know methods to route incoming e-mails. Regulating software 314 operates as described below in connection with FIGS. 5A-C and 6 to regulate e-mail flowing between servers. Regulating database software 316 implements the data structure described below with reference to FIG. 4 and stores the data used by regulating software 314.

FIG. 4 is a diagram depicting various entities and relationships established in a database system in accordance with an aspect of the present invention. As shown, a database, which may be maintained by server 110, 112, or 114, has stored therein data representing source categories 410. The source categories 410 represent a list of categories of sources from which e-mail may be received. These categories are referred to herein as "e-mail source categories" and are used in the evaluation of e-mails from un-registered sources. Typical e-mail source categories might include, for example, the following: large ISP—designating ISP's servicing a large number of users; medium ISP—designating ISP's servicing a medium number of users; small ISP—designating ISP's servicing a small number of users; .gov—designating sources in the .gov domain; .edu—designating sources in the .edu domain; and .com—designating sources in the .com domain. Of course, other e-mail source categories may be used depending upon the type of e-mail that it is desired to regulate.

Each source category has a set of target statistics 412 associated therewith. Target statistics might include, for example, a maximum e-mail volume that to may be received in a prescribed period of time from a source in a particular source category. The database may prescribe, for example, that a maximum of 200,000 e-mails per hour may be received and processed from a source that is classified in the ".edu" source category. The target statistics may further specify that the amount and types of e-mails that are allowed vary during different periods of the day. For example, during the off-peak hours of 12 AM to 5 AM, a larger number of e-mails may be accepted than during normal processing hours. Such a restriction may encourage postmasters to time-shift the delivery of unimportant e-mail. As explained in further detail below, the category statistics operate as benchmarks for the un-registered e-mail sources that fall within the particular category.

Each source category also has an e-mail profile 414 associated therewith. The target e-mail profile 414 identifies target characteristics for e-mails that are received from an un-registered source in a particular source category. For example, the target e-mail profile 414 for a particular source category might identify the maximum size for an e-mail, the maximum number of recipients, the types of attachments that might be included with the e-mail, the maximum number of hops that the e-mail may have taken prior to arriving at the mail server, and whether the source has agreed to be charged for delivery of e-mail. These characteristics are used as benchmarks to identify irregular mail activities.

A plurality of e-mail sources 416 may be associated with any one source category 410. For example, the ".com" source category may have a plurality of e-mail sources. Thus, sources such as, for example, bellsouth.com and hotmail.com would be related to the ".com" source category. For sources that have been registered, a designation of such is made in the database.

The database further comprises a set of statistics 418 for each e-mail source 416. The statistics are continuously updated to reflect each e-mail that is received from a particular source. For example, each time an e-mail is received in the system from a particular source such as, for example, bellsouth.com, the statistic holding the counter of e-mails received from that particular site is incremented. The statistics may also reflect the time and date that e-mails are received.

The database still further comprises a profile 420 for e-mails received from each registered source. Thus, the postmaster may, during the process of registration, define specific guidelines or a profile for e-mails from the registered source. The items that are part of the profile may be the same or similar to those used in connection with un-registered e-mail but the specific target values for the registered site may vary depending upon the postmaster's judgment and the particulars of the registered site.

Finally, the database may comprise target statistics 422 for each registered source. Accordingly, during the registration process, the postmaster may define specific target statistics for the registered site. The types of statistics that are required for registered sites may be the same or similar to those required for un-registered sources. However, the statistics for the registered source may be defined by the postmaster to reflect agreements that have been arranged with the registered source. For example, by agreement the communication of e-mails from the registered source may be skewed to be received during off-peak hours. Such an arrangement may be reflected in the statistics for the particular registered source. Furthermore, the statistics for a registered source may specify that the source has agreed to pay for services such as the delivery of e-mail.

The process of registering a source involves identifying the source, specifying target statistics for the source, and specifying an e-mail profile for e-mails from the source. This information is gathered from the postmaster, preferably through a series of interactive screens, and stored in the database.

Figure 6:
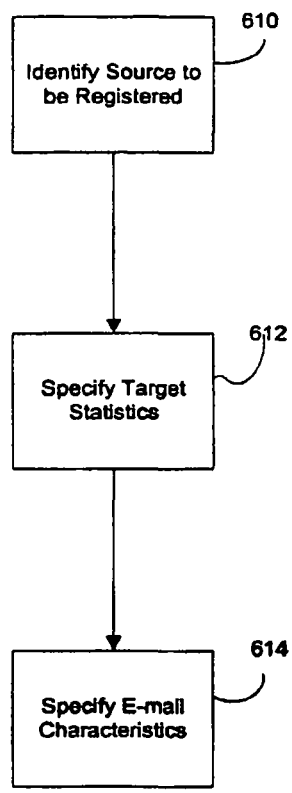
FIG. 6 is a flow diagram of a process for registering a source with the system.

FIG. 6 provides a flowchart of a process for registering an e-mail source. At step 610, the postmaster identifies the source that is to be registered. The source may be identified by domain name, IP address, or any other means that uniquely identifies and Internet domain. At step 612, the postmaster specifies the target statistics for the source. For example, the postmaster may specify that between the hours of 8 AM and 8 PM, the maximum number of e-mails that may be received from the source should be 100,000, while between the hours of 8 PM and 8 AM 200,000 e-mails may be received per hour. The postmaster may also specify that the source has agreed to pay for services such as delivery of e-mail. At step 614, the postmaster defines the target profile characteristics for e-mails from the registered source. For example, the postmaster may specify that e-mails from the registered source should not contain attachments or the attachments should be less than a prescribed file size.

Figure 5A:
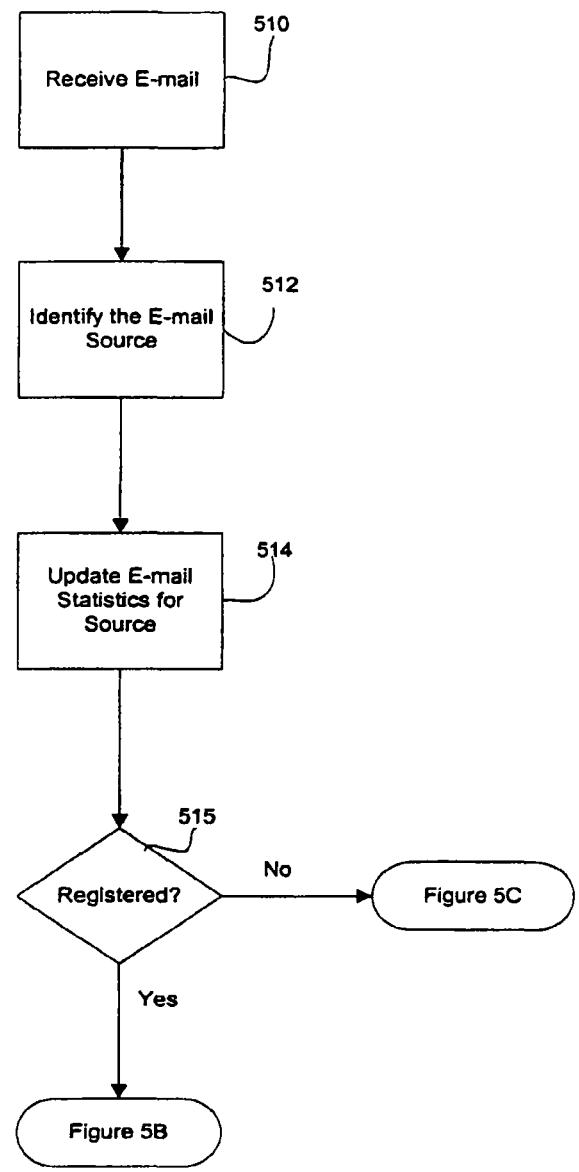
FIGS. 5A, 5B, and 5C are flow diagrams of a method in accordance with the invention for managing electronic messages.

FIG. 5A is a flowchart of a method for regulating e-mails in accordance with an aspect of the invention. As shown, at step 510, an e-mail is received at an e-mail server. For example, an e-mail may be received from smith@yahoo.com. At step 512, the regulating software 314 identifies the source of the e-mail. With respect to the exemplary e-mail from smith@yahoo.com, the source is identified as yahoo.com.

Those skilled in the art will recognize that an electronic message that has been forwarded numerous times may have multiple domains or "sources" listed in its header. Arguably, a single electronic message may be said to have "originated" from more than one source. Therefore, according to an aspect of the invention, at step 512 an electronic message may be designated as originating from more than one source. For example, a single electronic message may be said to have originated from the first or the last "hop" identified in the header information. An electronic message that is designated as having originated from more than one source is evaluated twice in the manner described below—once for each of the two sources.

At step 514, regulating software 314 updates the e-mail statistics 418 that are stored in database 316 to reflect receipt of the e-mail. For example, the statistic used to hold the counter of the number of e-mails received from yahoo.com is incremented.

Figure 5B:
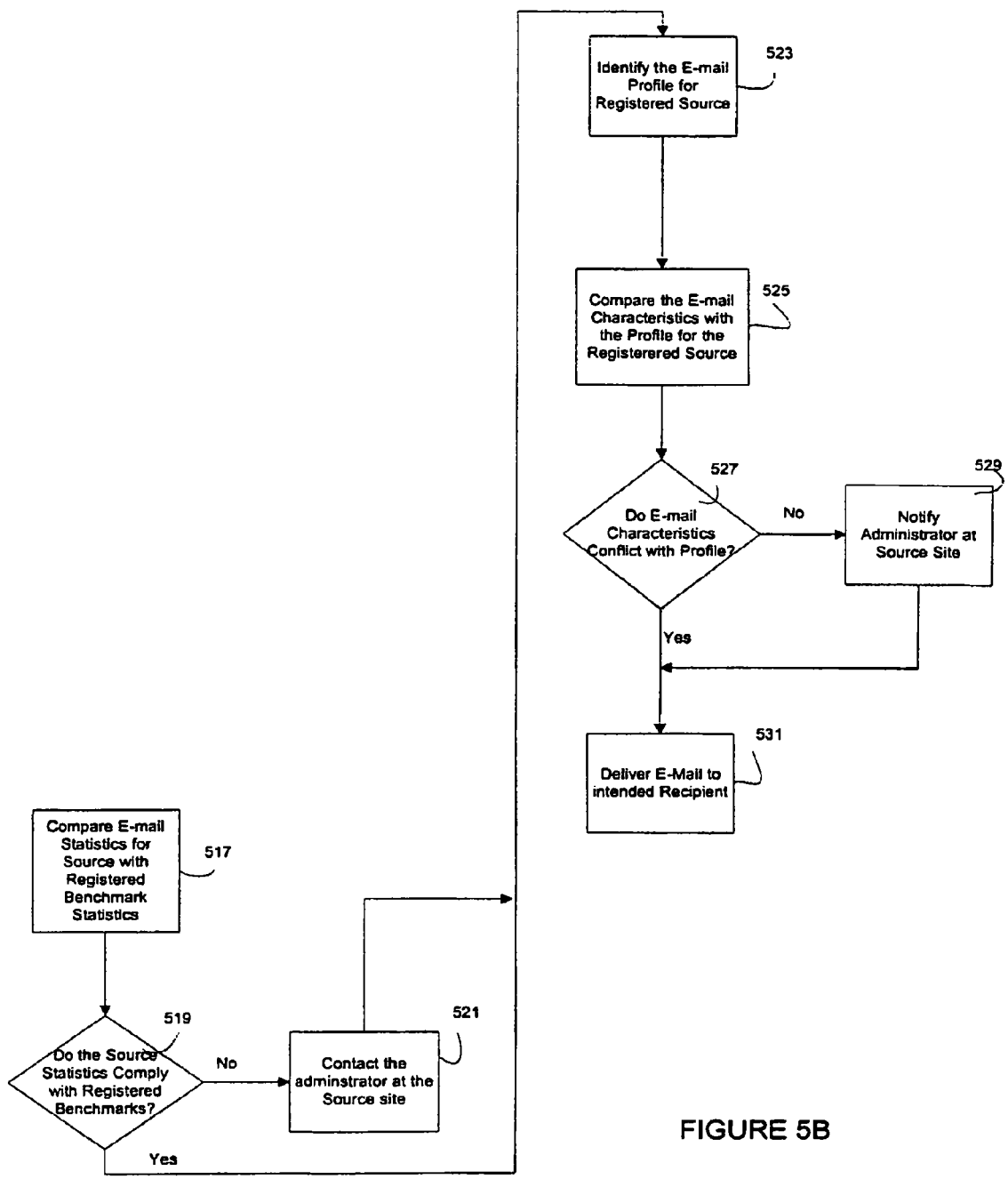

At step 515, regulating software 314 determines if the source has been registered by the postmaster. If the source is determined to be registered as defined in the database entity 416, processing continues at step 517 as depicted in FIG. 5B. At step 517, the e-actual mail statistics 418 for the registered source of the e-mail are compared to the target statistics 422 for the registered source as determined by the postmaster. With respect to the example e-mail, assuming "yahoo.com" is a registered source, the statistics associated with "yahoo.com" are compared to the target statistics defined by the postmaster. At step 519, regulating software 414 determines whether the source statistics 418 fail to comply with the target statistics 422. For example, the volume of e-mails received over the course of the last hour from the source "yahoo.com" is compared with the target value for volume of e-mail specified by the is postmaster for the registered source. If the value for the statistic of the source does not correspond to the target statistic as defined for the particular source, step 521, the postmaster at the registered source is notified. For example, if the volume of e-mails received from "yahoo.com" is determined to be outside the benchmark specified by the postmaster for the source, an e-mail is sent to the postmaster of yahoo.com apprising him or her of the situation.

At step 523, regulating software 314 retrieves the profile of characteristics for e-mails 420 received from the particular registered source. At step 525, the characteristics of the e-mail under consideration are compared to the e-mail profile 420 defined by the postmaster for the registered source. For example, the characteristics for the e-mail from smith@yahoo.com are compared to the e-mail profile characteristics specified by the postmaster for the registered source. For example, the comparison might include determining if the number of recipients exceeds the limit stored in the e-mail profile characteristics.

If at step 527, the characteristics of the e-mail under consideration conflict with the profile defined for the registered source, at step 529, the sender and the postmaster of the source web site are notified. If at step 527, there is no discrepancy between the e-mail and the profile 420, the e-mail is delivered to the intended recipient as specified at step 531.

Figure 5C:
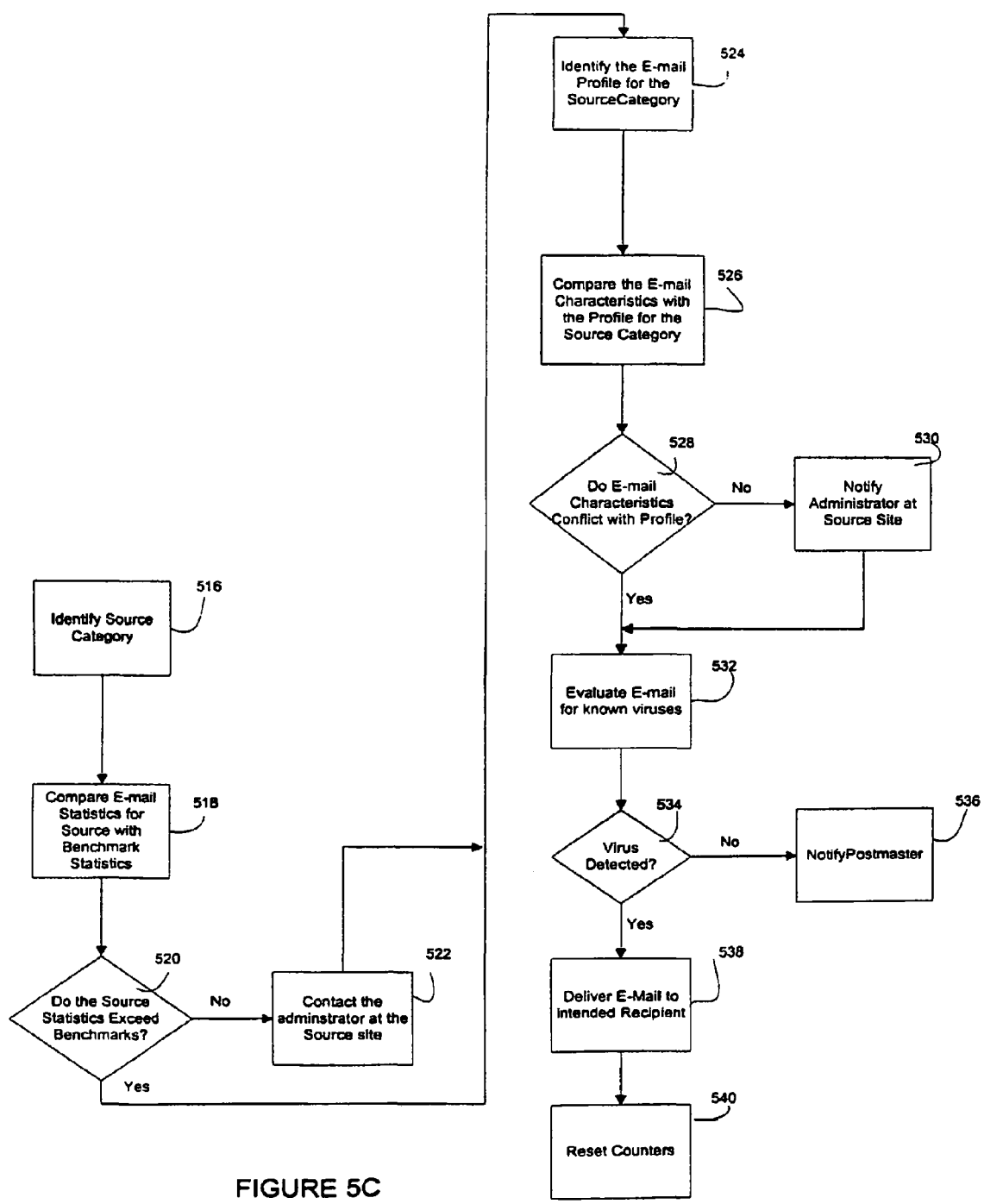

Referring back to FIG. 5A, if at step 515, regulating software 314 determines that the source has not been registered, processing continues at step 516 as depicted in FIG. 5C. At step 516, regulating software 314 identifies the source category with which the source of the e-mail is related. With respect to the example, the source of the e-mail, "yahoo.com," is identified as being associated with the ".com" source category. It should be noted that sources could also be identified by way of an IP address.

At step 518, the e-mail statistics 418 for the source of the e-mail are compared to the target statistics 412 for the source category. With respect to the example e-mail, the statistics associated with "yahoo.com" are compared to the target statistics associated with ".com" source category. At step 520, regulating software 414 determines whether the source statistics fail to comply with the target statistics for the associated source category. For example, the volume of e-mails received over the course of the last hour from the source "yahoo.com" are compared with the target value for volume of e-mail associated with the source category ".com." If the value for the statistic of the source does not correspond to the target statistic for the associated source category, at step 522, the postmaster at the source is notified. For example, if the volume of e-mails received from "yahoo.com" is determined to be outside the benchmark set for the ".com" source category, an e-mail is sent to the postmaster of yahoo.com apprising him or her of the situation.

At step 524, regulating software 314 retrieves the profile of characteristics for e-mails received from the relevant source category. With respect to the example, the e-mail profile 414 is retrieved for the ".com" source category. At step 526, the characteristics of the e-mail under consideration are compared to the e-mail profile. For example, the characteristics for the e-mail from smith@yahoo.com are compared to the e-mail profile characteristics stored in relation to the ".com" source category. The comparison might include is determining if the number of recipients exceeds the limit stored in the e-mail profile characteristics.

If at step 528, the characteristics of the e-mail under consideration conflict with the profile associated with the source category, at step 530, the sender and the postmaster of the source web site are notified.

At step 532, the e-mail is evaluated against a known set of viruses. If a virus is detected at step 534, the e-mail is not delivered and the postmaster and/or administrator are notified at step 536. If, however, no viruses are detected, at step 538, the e-mail is delivered to the intended recipient.

It should be noted that in alternative embodiments, if at step 520, the source statistics did not comply with the target statistics or at step 528 the e-mail characteristics did not comply with the e-mail profile, the e-mail might not be delivered to the intended recipient but returned to user from which the e-mail was forwarded.

Finally, at step 540, any counters that are used in connection with the collection of statistics for the source and which need to be reset, are reset. For example, if one of the statistics that is collected for a source is the number of e-mails received during the current hour and the hour has expired, the counter is reset at step 540.

Thus, systems and methods for regulating the flow of electronic messages have been disclosed. These novel systems and methods allow postmasters and administrators to place limits on the type and amounts of electronic messages that are accepted into the system. This will help postmasters and administrators slow the influx of SPAM and save resources for legitimate uses.

Those skilled in the art understand that computer readable instructions for implementing the above described processes, such as those described with reference to FIG. 5, can be generated and stored on one of a plurality of computer readable media such as a magnetic disk or CD-ROM. Further, a computer such as that described with reference to FIG. 2 may be arranged with other similarly equipped computers in a network, and each computer may be loaded with computer readable instructions for performing the above described processes. Specifically, referring to FIG. 2, microprocessor 322 may be programmed to operate in accordance with the above-described processes.

While the invention has been described and illustrated with reference to specific embodiments, those skilled in the art will recognize that modification and variations may be made without departing from the principles of the invention as described above and set forth in the following claims. For example, while, the invention has been described as being used to regulate the in-flow of e-mail at a mail server, the invention might also be used to regulate the out-flow of e-mail at a web server. Furthermore, the invention may be employed to regulate the flow of all types of electronic messages, including instant messaging. Accordingly, reference should be made to the appended claims as indicating the scope of the invention.

What is claimed is:

1. A method for regulating electronic messages comprising:
    registering an electronic message source;
    maintaining a profile associated with the electronic message source, the profile comprising a first target statistics value associated with the electronic message source;
    receiving an electronic message from a source;
    updating a statistics value related to the source to generate an updated statistics value;
    in response to determining that the source is the electronic message source that has been registered:
        comparing the updated statistics value to the first target statistics value; and
        taking a remedial action with respect to the electronic message received if the updated statistics value conflicts with the first target statistics value.

2. The method of claim 1, wherein registering the electronic message source comprises:
    identifying the electronic message source;
    specifying the first target statistics value associated with the electronic message source; and
    creating the profile associated with the electronic message source.

3. The method of claim 2, wherein the specifying the first target statistics value associated with the electronic message source is based on whether the electronic message source has agreed to be charged for delivery of electronic messages.

4. The method of claim 1, further comprising:
    specifying a second target statistics value associated with a source category.

5. The method of claim 4, wherein the second target statistics value specifies one of an acceptable volume of electronic messages that may be received, a maximum size of an electronic message that may be received, a type of attachment that may be included in an electronic message, a maximum number of recipients of an electronic message, and a maximum number of hops that an electronic message received may have taken.

6. The method of claim 5, wherein the second target statistics value further specifies a number of electronic messages that may be received during normal processing hours and a number of electronic messages that may be received during off-peak hours.

7. The method of claim 6, wherein the first target statistics value specifies one of an acceptable volume of electronic messages that may be received, a maximum size of an electronic message that may be received, a type of attachment that may be included in an electronic message, a maximum number of recipients of an electronic message, and a maximum number of hops that an electronic message received may have taken.

8. A non-transitory computer readable medium storing computer program instructions for regulating electronic messages, which, when executed by a processor, cause the processor to perform operations comprising:
    registering an electronic message source;
    maintaining a profile associated with the electronic message source, the profile comprising a first target statistics value associated with the electronic message source;
    receiving an electronic message from a source;
    updating a statistics value related to the source to generate an updated statistics value;
    in response to determining that the source is the electronic message source that has been registered:
        comparing the updated statistics value to the first target statistics value; and
        taking a remedial action with respect to the electronic message received if the updated statistics value conflicts with the first target statistics value.

9. The non-transitory computer readable medium of claim 8, operations further comprising: identifying the electronic message source; specifying the first target statistics value associated with the electronic message source; and creating the profile associated with the electronic message source.

10. The non-transitory computer readable medium of claim 9, wherein the specifying the first target statistics value associated with the electronic message source is based on whether the electronic message source has agreed to be charged for delivery of electronic messages.

11. The non-transitory computer readable medium of claim 8, operations further comprising: specifying a second target statistics value associated with a source category.

12. The non-transitory computer readable medium of claim 8, wherein the second target statistics value specifies one of an acceptable volume of electronic messages that may be received, a maximum size of an electronic message that may be received, a type of attachment that may be included in an electronic message, a maximum number of recipients of an electronic message, and a maximum number of hops that an electronic message received may have taken.

13. The non-transitory computer readable medium of claim 12, wherein the second target statistics value further specifies a number of electronic messages that may be received during normal processing hours and a number of electronic messages that may be received during off-peak hours.

14. The non-transitory computer readable medium of claim 13, wherein the first target statistics value specifies one of an acceptable volume of electronic messages that may be received, a maximum size of an electronic message that may be received, a type of attachment that may be included in an electronic message, a maximum number of recipients of an electronic message, and a maximum number of hops that an electronic message received may have taken.

15. An apparatus comprising:
    a processor; and
    a memory to store computer program instructions, the computer program instructions, when executed on the processor, cause the processor to perform operations comprising:
        registering an electronic message source;
        maintaining a profile associated with the electronic message source, the profile comprising a first target statistics value associated with the electronic message source;
        receiving an electronic message from a source;
        updating a statistics value related to the source to generate an updated statistics value;
        in response to determining that the source is the electronic message source that has been registered:
            comparing the updated statistics value to the first target statistics value; and
            taking a remedial action with respect to the electronic message received if the updated statistics value conflicts with the first target statistics value.

16. The apparatus of claim 15, wherein registering the electronic message source further comprises:
    identifying the electronic message source;
    specifying the first target statistics value associated with the electronic message source; and
    creating the profile associated with the electronic message source.

17. The apparatus of claim 15, wherein the specifying the first target statistics value associated with the electronic message source is based on whether the electronic message source has agreed to be charged for delivery of electronic messages.

18. The apparatus of claim 15, the operations further comprising:
    specifying a second target statistics value associated with a source category.

19. The apparatus of claim 18, wherein the second target statistics value specifies one of an acceptable volume of electronic messages that may be received, a maximum size of an electronic message that may be received, a type of attachment that may be included in an electronic message, a maximum number of recipients of an electronic message, and a maximum number of hops that an electronic message received may have taken.

20. The apparatus of claim 19, wherein the second target statistics value further specifies a number of electronic messages that may be received during normal processing hours and a number of electronic messages that may be received during off-peak hours.

* * * * *